(12) United States Patent
Keller et al.

(10) Patent No.: US 8,231,259 B2
(45) Date of Patent: Jul. 31, 2012

(54) LUMINAIRE HAVING SEPARATE LAMPS FOR DIRECT LIGHTING AND INDIRECT LIGHTING

(75) Inventors: Katherina Keller, Lindau (DE); Manfred Petschulat, Wolfurt (AT)

(73) Assignee: Zumtobel Lighting GmbH, Dornbirn (AT)

( * ) Notice: Subject to any disclaimer, the term of this patent is extended or adjusted under 35 U.S.C. 154(b) by 46 days.

(21) Appl. No.: 12/920,316

(22) PCT Filed: Mar. 13, 2009

(86) PCT No.: PCT/EP2009/001843
§ 371 (c)(1),
(2), (4) Date: Nov. 19, 2010

(87) PCT Pub. No.: WO2009/112277
PCT Pub. Date: Sep. 17, 2009

(65) Prior Publication Data
US 2011/0051402 A1    Mar. 3, 2011

(30) Foreign Application Priority Data

Mar. 14, 2008 (DE) .......................... 10 2008 014 317

(51) Int. Cl.
*F21V 7/04* (2006.01)
*F21S 8/06* (2006.01)

(52) U.S. Cl. ........ 362/610; 362/609; 362/612; 362/613; 362/404

(58) Field of Classification Search .................. 362/147, 362/404, 609, 610, 612, 613, 621, 623, 625, 362/249.02, 608, 228, 229
See application file for complete search history.

(56) References Cited

U.S. PATENT DOCUMENTS

| 6,174,069 | B1 * | 1/2001 | Plunk et al. ................... 362/147 |
| 6,296,372 | B1 | 10/2001 | Rhomberg |
| 6,945,668 | B1 * | 9/2005 | Orlov et al. ................... 362/225 |
| 7,736,018 | B2 | 6/2010 | Ladstaetter |

FOREIGN PATENT DOCUMENTS

| DE | 19755658 A1 | 6/1999 |
| DE | 102005005454 A1 | 8/2006 |
| DE | 102005027261 A1 | 12/2006 |
| EP | 0846915 A1 | 6/1998 |

OTHER PUBLICATIONS

International Search Report for PCT/EP2009/001843 dated Jul. 7, 2009.

* cited by examiner

*Primary Examiner* — Thomas Sember
(74) *Attorney, Agent, or Firm* — Marshall, Gerstein & Borun LLP

(57) ABSTRACT

The present invention relates to a luminaire, which comprises a plate-shaped light guide, and first lamps disposed on one or more narrow sides of the light guide and configured to couple light into the plate-shaped light guide, wherein the light coupled into the light guide is emitted via a flat side of the light guide in a first irradiating direction of the luminaire. Said luminaire is characterized in that the first lamps are formed by a plurality of light-emitting diodes and that the luminaire furthermore comprises second lamps and a reflector arrangement associated therewith, by way of which the light of the second lamps is emitted in a second irradiating direction opposite the first irradiation direction.

14 Claims, 7 Drawing Sheets

Fig. 10

LUMINAIRE HAVING SEPARATE LAMPS FOR DIRECT LIGHTING AND INDIRECT LIGHTING

BACKGROUND OF THE INVENTION

1. Field of the Invention

This invention concerns a luminaire that has a plate-shaped optical waveguide, and first illuminants arranged on one or more narrow sides of the optical waveguide and designed to couple light into the plate-shaped optical waveguide, the light coupled into the optical waveguide being emitted via a flat side of the optical waveguide in a first radiating direction of the luminaire.

2. Related Technology

Such a luminaire is known from DE 197 55 658 A1 by the applicant, and is sold under the designation AERO waveguide luminaire. This luminaire is generally very popular, since it is characterized by an extremely flat shape and fulfils the requirements of modern office situations. The luminaire can be arranged freely in the room, and makes reflection-free working possible on vertical or strongly inclined screens, since the radiated light is emitted homogeneously over the whole flat side of the plate-shaped optical waveguide element. Since it is impossible to look at the illuminants directly from below, the luminaire also satisfies the highest aesthetic demands.

The luminaire disclosed in DE 197 55 658 A1 can be in such a form that the light of the illuminants is partly radiated upward as indirect lighting. It is also generally known that light which is radiated via an optical waveguide element has less intensity compared with directly radiated light. Accordingly, in the case of the luminaire described here, the indirect portion of the light, which is radiated upwardly, has a higher intensity than the portion of the light which is radiated downwardly via the optical waveguide element. This is usually seen as a disadvantage of the luminaire, since the coefficient of lighting utilization is very small, because of the inefficient direct component.

A further luminaire known from the prior art is disclosed in DE 10 2005 005 454 A1. This luminaire has discharge lamps as first illuminants, the light of the discharge lamps being coupled into a light pipe and radiated by it in different directions. Also, in a preferred embodiment, the luminaire has light-emitting diodes (LEDs), which are used to generate color effects. The light radiated upwardly from the light pipe for indirect lighting is mixed with the light of the LEDs.

SUMMARY OF THE INVENTION

The invention overcomes the disadvantage stated in relation to the luminaire disclosed in DE 197 55 658 A1, while retaining the advantageous properties of this luminaire.

According to the invention, therefore, a luminaire is has a plate-shaped optical waveguide and first illuminants arranged on one or more narrow sides of the optical waveguide and designed to couple light into the plate-shaped optical waveguide, wherein the light which is coupled into the optical waveguide is emitted via a flat side of the optical waveguide in a first radiating direction of the luminaire, the first illuminants are formed by multiple LEDs, and the luminaire also has second illuminants and a reflector arrangement which is associated with them, and via which the light of the second illuminants is emitted in a second radiating direction which is opposite to the first radiating direction.

The luminaire according to the invention differs from luminaires which are known from the prior art in that the efficiency of the direct lighting was significantly increased. In particular, it has turned out that by using LEDs for direct lighting via an optical waveguide, the coefficient of lighting utilization of the direct component can be decisively increased.

Further advantages of the luminaire according to the invention are the extremely flat shape and a homogeneous light profile, since the light is radiated evenly over the whole flat side of the optical waveguide.

The luminaire according to the invention is preferably a pendant luminaire which can be fixed to a ceiling. However, the luminaire can also be fixed to a wall.

Preferably, on the narrow sides of the plate-shaped optical waveguide, onto which the light of the first illuminants is coupled, a structure for coupling the light in evenly is formed. For this purpose, the narrow sides of the plate-shaped optical waveguide, onto which the light of the first illuminants is coupled, are in such a form that they each form, directly in front of each LED, a pyramid-shaped structure with an inwardly curved peak.

Preferably, the narrow sides of the plate-shaped optical waveguide in regions of the coupling-in structure, and the flat side, and the opposite side of the optical waveguide in regions of the coupling-in structure, are in reflecting form. In this way, light beams which are radiated from the LEDs at very steep angles are reflected back into the optical waveguide.

Also, the narrow sides of the plate-shaped optical waveguide can be overlapped by a reflector, which in regions of the coupling-in structure has recesses through which the first illuminants extend into the coupling-in structure.

The second illuminants preferably have at least one discharge lamp. However, using a different illuminant, e.g. incandescent bulbs or LEDs, is also conceivable here. The light of the second illuminants is radiated as indirect lighting on the upper side of the luminaire.

In a preferred embodiment, the first illuminants have multiple LEDs in at least two different colors. In this way, different color effects can be achieved with the luminaire, in particular it is made possible to set the color temperature of the direct light. Alternatively, it is also possible to use LEDs which emit white light.

Greater flexibility can also be achieved if the two illuminants can be controlled separately from each other, it being possible to set settings such as light quantity and light color for both illuminants separately.

To achieve even radiation of the light, on the opposite side of the plate-shaped optical waveguide to the flat side of the plate-shaped optical waveguide that is provided to emit light, a structure at which the light is scattered can be printed on. In this case, it is also advantageous if the distances between the structure become narrower towards the middle of the plate.

Preferably, on the opposite side of the plate-shaped optical waveguide to the flat side of the plate-shaped optical waveguide that is provided to emit light, a reflector is provided that reflects the light which emerges from the optical waveguide oppositely to the first radiating direction back into the optical waveguide, so that it emerges on the desired flat side of the optical waveguide.

Behind the plate-shaped optical waveguide, Seen in the first radiating direction, a translucent plate with an anti-glare structure or diffuser is preferably arranged, in which case, seen in the first radiating direction, a further, plane and translucent closing plate can be arranged behind this plate. The anti-glare structure or diffuser removes glare from the light emitted by the luminaire in the first radiating direction. Accordingly, the luminaire is suitable for use in rooms with strongly inclined displays. Unwanted reflections on the displays are avoided, and the luminaire can be arranged anywhere in the room.

Also, in a preferred embodiment, the plate-shaped optical waveguide is held by at least two opposite supporting members, the holders for the first and second illuminants being arranged in these supporting members. With such an arrangement, it is impossible to look directly at the illuminants.

BRIEF DESCRIPTION OF THE DRAWINGS

Below, the invention will be explained in more detail on the basis of the attached drawings.

DETAILED DESCRIPTION

Figure 1:
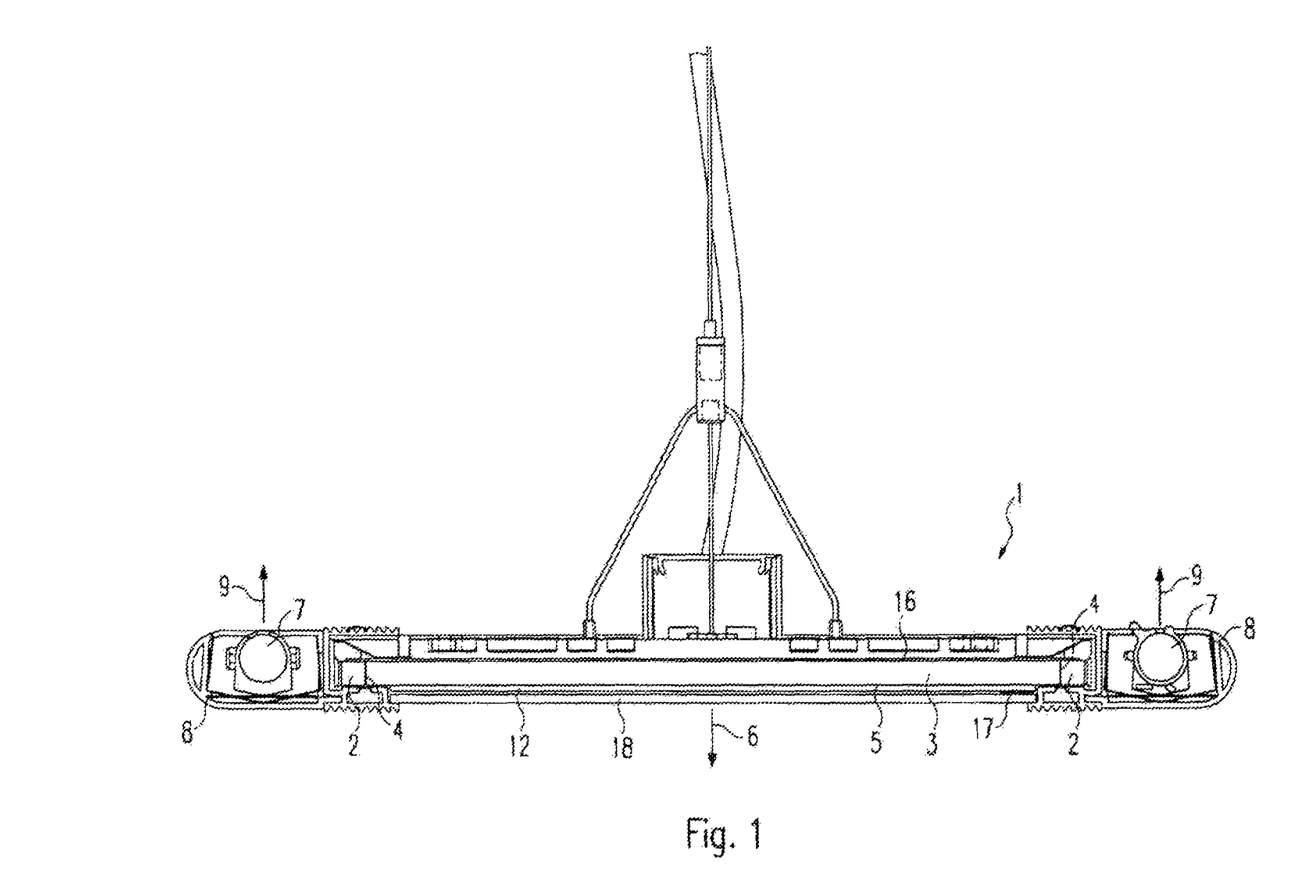
FIG. 1 shows a cross-section of the luminaire according to the invention.

The luminaire 1 according to the invention is shown in FIG. 1 in cross-section. This luminaire 1 has first illuminants, which according to the invention are LEDs 2. The light of the LEDs 2 is coupled into a plate-shaped optical waveguide 3. The light is coupled in at one or more narrow sides 4 of the plate-shaped optical waveguide 3. The light is also radiated at one of the flat sides 5 of the plate-shaped optical waveguide 3. The reference symbol 6 here designates the radiating direction for the direct lighting generated by the first illuminants.

The plate-shaped optical waveguide 3 is preferably produced from transparent PMMA. However, other materials are conceivable. A plate-shaped light pipe could also be used.

In contrast to the luminaires which are known from the prior art, the luminaire 1 according to the invention also has holders for second illuminants 7. In the embodiment shown here, the second illuminants 7 are discharge lamps. However, using a different illuminant with the luminaire according to the invention is also conceivable. In the case of the luminaire 1, the light emitted by the second illuminants 7 is radiated upward as indirect lighting. For this purpose, the luminaire 1 also has reflector arrangements 8, which are associated with the second illuminants 7. The reference symbol 9 designates the radiating direction for the indirect lighting which is radiated upward.

By the use according to the invention of two different illuminants 2 and 7 to generate the direct lighting 6 and indirect lighting 9, the problem of the luminaire known in the prior art, that with only one common light source the intensity of the indirect lighting is greater than the intensity of the direct lighting, which is emitted via an optical waveguide element, can be overcome.

In the case of the luminaire 1 according to the invention, the luminous intensity of the LEDs 2 can be adjusted in such a way that the intensity of the direct lighting 6 is higher than the intensity of the indirect lighting 9.

It is also possible, via an appropriate controller, to control the LEDs 2 and the second illuminants 7 separately from each other. In this case they can be switched on and off independently of each other, and preferably settings such as light color, color temperature or light quantity can be controlled for both illuminants 2, 7 independently of each other.

In a preferred embodiment, LEDs 2 of different colors are used in the luminaire 1. In this case, a desired light color of the direct lighting 6 can be controlled specially easily. Alternatively, it is of course also possible to use LEDs 2 which radiate white light.

If the indirect portion 9 of the lighting is generated using discharge lamps, an efficiency of just under 100 lm/W is achievable, with high intensity and evenness. According to the invention, the direct portion 6 of the lighting is generated using LEDs 2. These have a maximum achievable efficiency of about 50 lm/W. Preferably, in the case of the luminaire 1 according to the invention, one or more of the techniques stated below are used to increase the efficiency of the LEDs.

Figure 2:
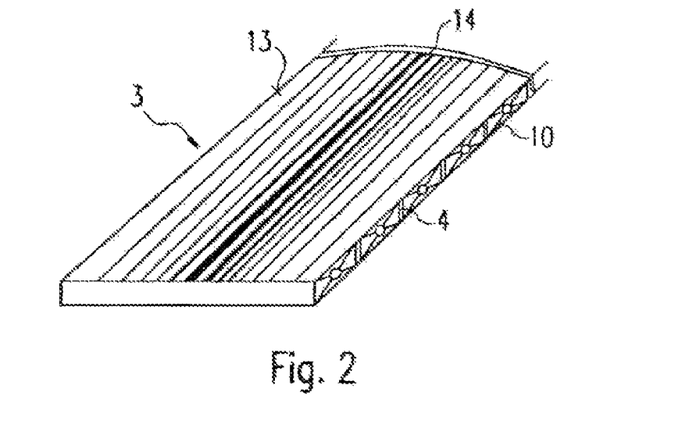
FIG. 2 shows a plate-shaped optical waveguide.
Figure 3:
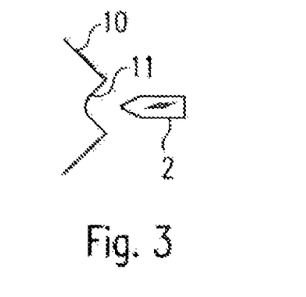
FIG. 3 shows an LED, and the structure of a lateral surface of a plate-shaped optical waveguide.

Preferably, at the narrow sides 4 of the plate-shaped optical waveguide 3 into which the light of the LEDs 2 is coupled, a structure for even and specially effective coupling-in of the light is arranged. A possible structure is shown in FIGS. 2 and 3, where the reference symbol 10 designates the stated structure.

This structure 10 here is designed so that the narrow sides 4 of the plate-shaped optical waveguide 3, at which the light of the LEDs 2 is coupled in, are in such a form that they each form, directly in front of each LED 2, a pyramid-shaped structure 10 with an inwardly curved peak 11. It has turned out that if almost point-source light is coupled in, this structure 10 ensures even distribution of the light within the plate-shaped optical waveguide 3. This structure 10 also supports the mixing of the individual light colors when LEDs 2 of different colors are used.

As shown in FIG. 1, below the plate-shaped optical waveguide 3 a further plate 12 is arranged. On the underside of this plate 12, an anti-glare structure 17 or diffuser is arranged, the anti-glare structure 17 only being indicated in FIG. 1. The anti-glare structure 17 can be in the form of a micro-pyramid structure, for example. What this achieves is that glare is removed from the light which is radiated as direct lighting 6, i.e. it is emitted only in a specified angle range. This property is important, in particular, when the luminaire 1 according to the invention is used in an office, since there are usually vertical or strongly inclined screens there, and a glare effect should be avoided.

Below the plate 12, which has the anti-glare structure 17 or a diffuser, a further, flat, translucent plate 18 is arranged. This is a so-called closing plate 18. Its purpose is to protect the luminaire 1 from damage and contamination.

Use of the plates 12 and 18 is an advantageous further development of the luminaire according to the invention. Dispensing with one or both plates 12, 18, or attaching them in an exchanged sequence, is quite conceivable. The plate 12 could also be in such a form that it generates special lighting effects, e.g. changes the light color by means of a filter.

Additionally, on the upper side of the plate-shaped optical waveguide 3, a reflector 16 is preferably arranged. Light beams which leave the optical waveguide 3 upward are reflected back into the optical waveguide 3 by the reflector 16, so that light is only radiated via the flat side 5 of the optical waveguide 3.

The flat side 13 of the plate-shaped optical waveguide 3 that is not intended to radiate the direct lighting is printed with a structure 14. As shown in FIG. 2, it consists of longitudinal stripes. Within the plate-shaped optical waveguide, light which has once been coupled in is mostly reflected by means of total internal reflection. However, if the light meets a structure 14 which is printed on the flat side 13, it is scattered at this structure and can emerge on the opposite flat side 5.

Figure 4:
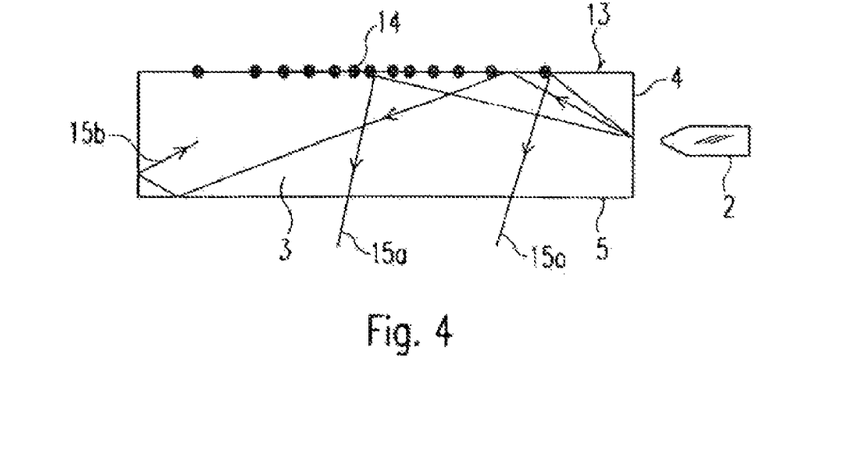
FIG. 4 shows a schematic cross-section through the plate-shaped optical waveguide.

This process is shown in FIG. 4. FIG. 4 shows a cross-section through a plate-shaped optical waveguide 3, and an LED 2, the light of which is coupled into the optical waveguide. The light beam 15b, which is drawn in as an example, is multiply totally reflected on the inside of the optical waveguide 3. In contrast, the light beams 15a strike the printed-on structure 14 on the flat side of the optical waveguide 3 and are scattered at it. Because of the scattering, these light beams 15a now strike the flat side 5 at such a sharp angle that total reflection does not occur, but instead the beams 15a leave the optical waveguide 3.

The light of the LED 2 is coupled in via the narrow side 4. Correspondingly, more light beams strike the marginal regions of the flat side 13 than the central region of the flat side 13. To ensure even radiation nevertheless, the distance between the printed-on structure elements 14 is less in the middle of the flat side 13.

The luminaire 1 shown in FIG. 1 is a pendant luminaire, which is fixed to a ceiling. However, the luminaire according to the invention could also be attached to a wall, at a certain distance.

Figure 5:
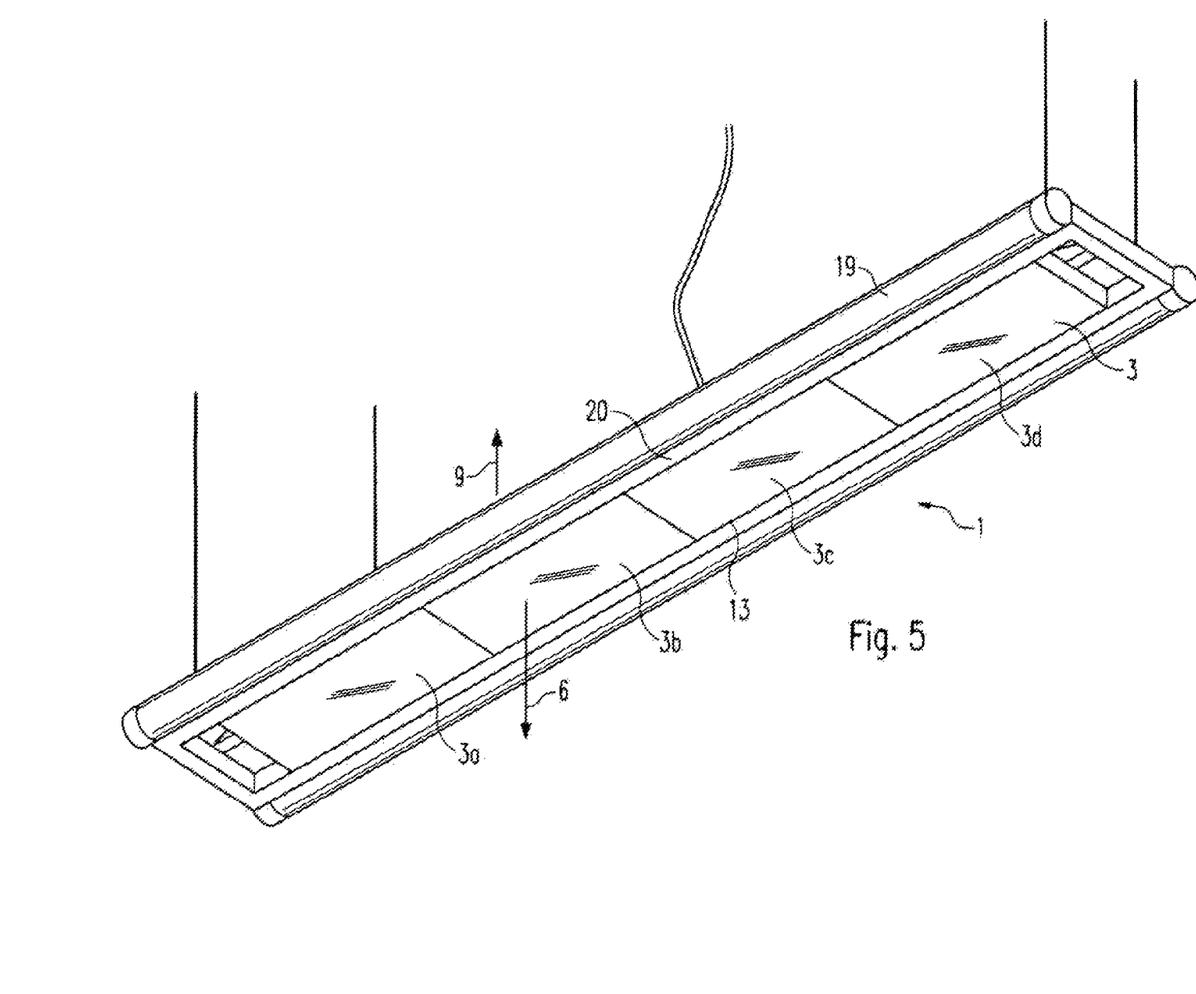
FIG. 5 shows a first embodiment of the luminaire according to the invention, in a perspective view from below.
Figure 6:
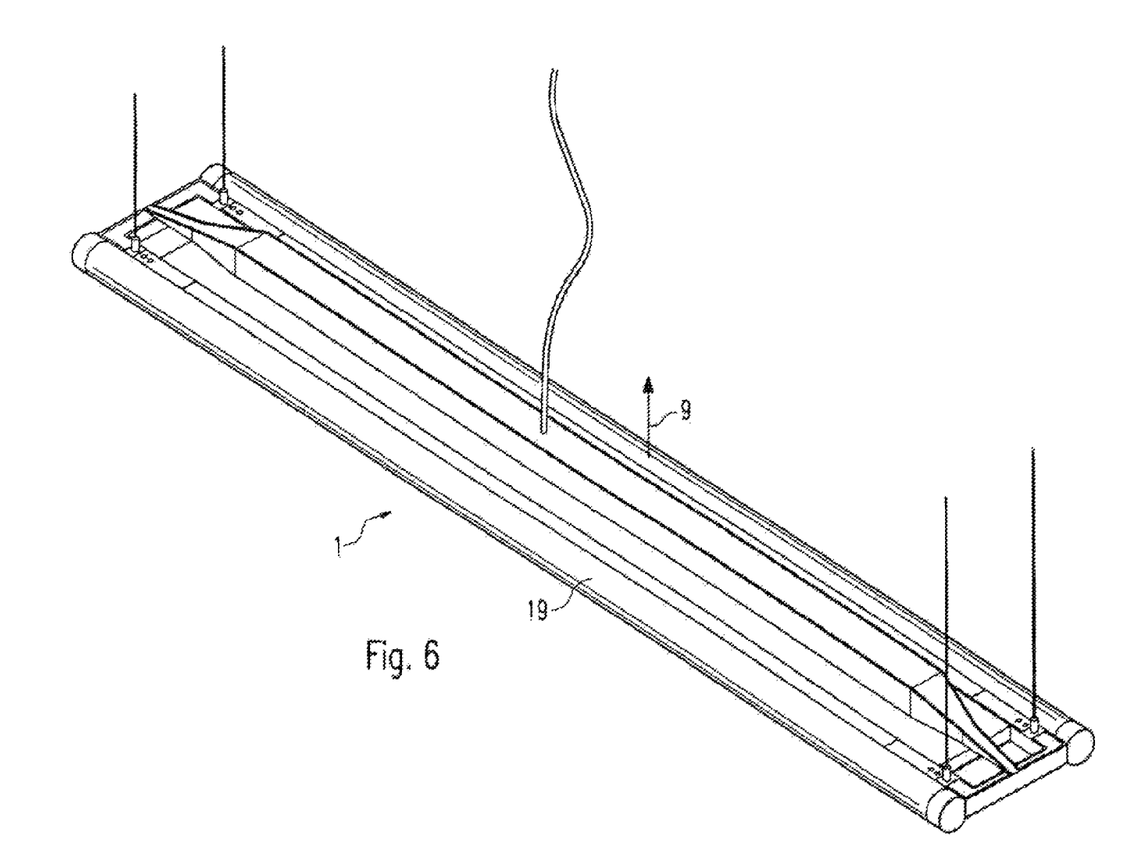
FIG. 6 shows the luminaire shown in FIG. 5, in perspective plan view.

FIGS. 5 and 6 show further perspective representations of the first embodiment of the luminaire 1 according to the invention.

FIG. 5 is a perspective representation of the luminaire according to the invention from below. The same reference symbols designate the same elements, which were explained in relation to the previous luminaires.

The luminaire shown in FIG. 5 has a plate-shaped optical waveguide 3, which is composed of four optical waveguide plates 3a, 3b, 3c, 3d arranged one behind the other.

On the sides of the plate-shaped optical waveguide 3, a luminaire carrier 12 is arranged, with at least two supporting members 13 opposite each other to support the optical waveguide 3. Preferably, the luminaire carrier 12 and the supporting members 13 are in such a form that the LEDs 2 and the holders for the second illuminants 7 are invisible to an observer standing under the luminaire 1. Reference symbols 6 and 9 again designate the direct lighting 6 and indirect lighting 9 respectively.

Figure 7:
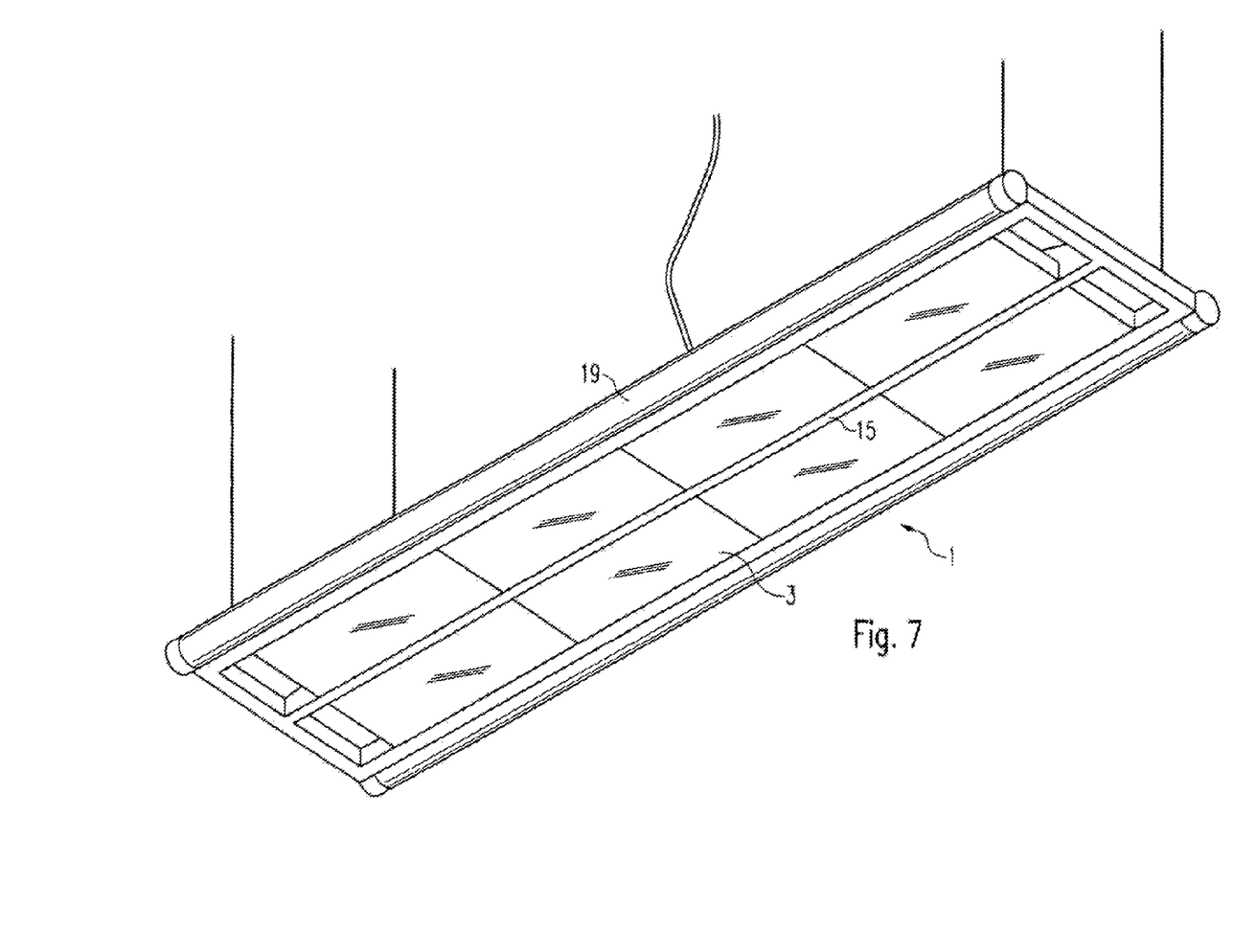
FIG. 7 shows a luminaire according to the invention, in a modified version, in a perspective view from below.
Figure 8:
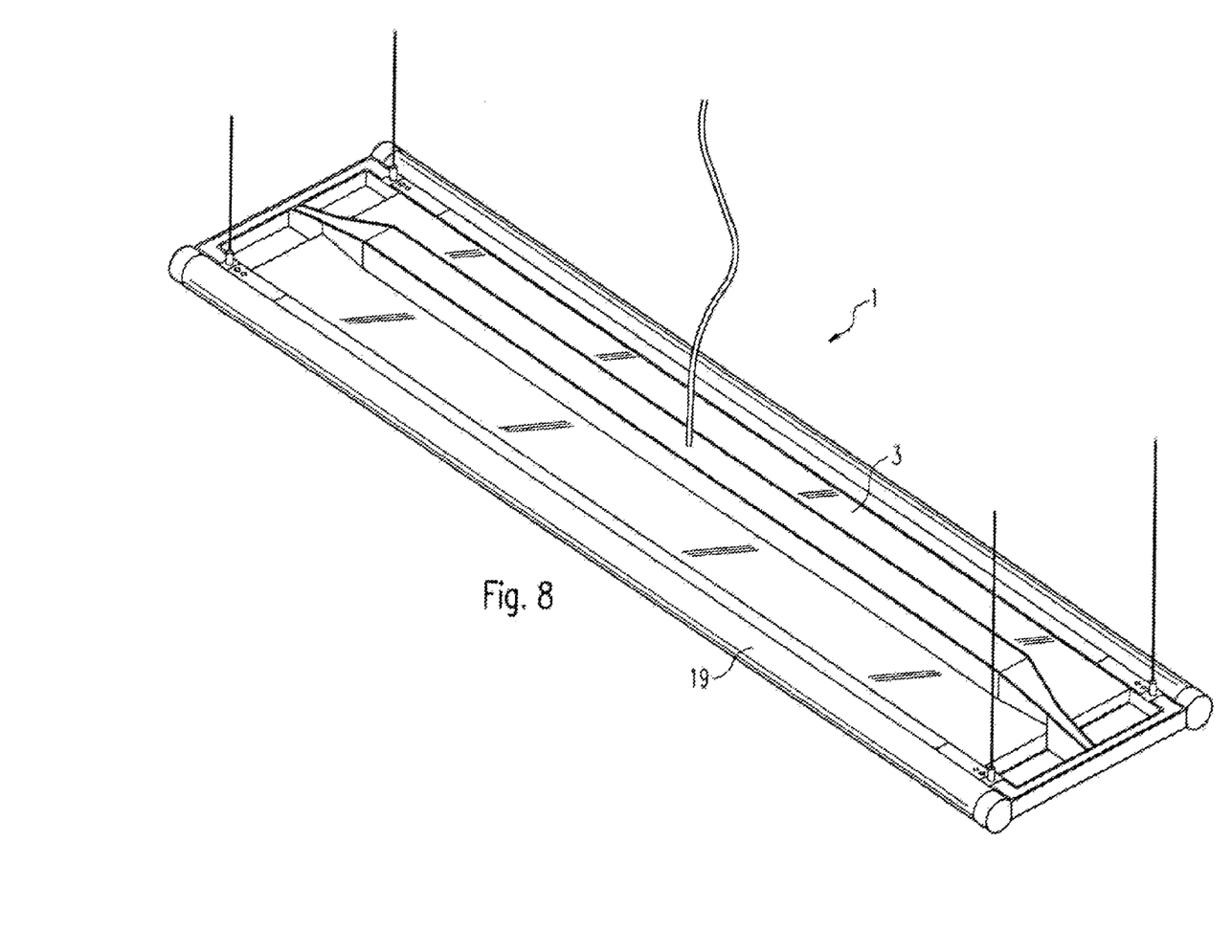
FIG. 8 shows the luminaire according to FIG. 7, in perspective plan view.

FIGS. 7 and 8 show an alternative embodiment of the luminaire according to the invention. Here the plate-shaped optical waveguide 3 is divided in the longitudinal direction by a longitudinal stay 15. Otherwise, this luminaire agrees with the first embodiment.

Figure 9:
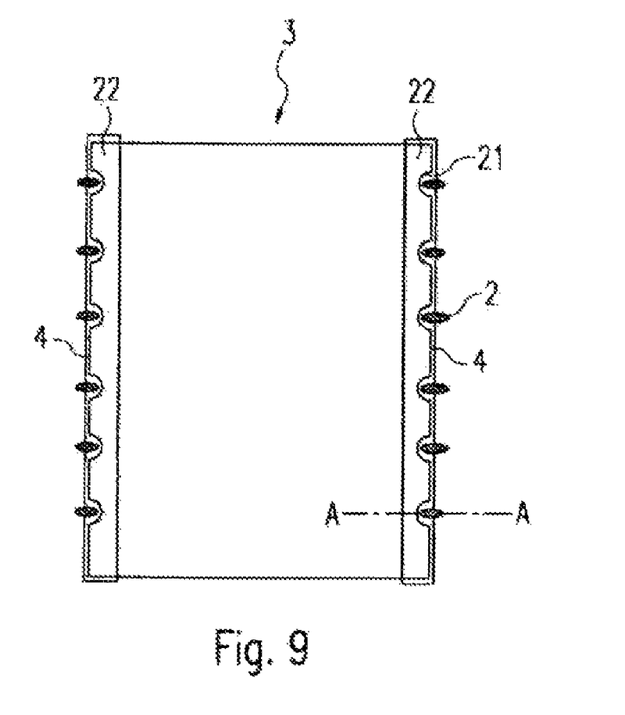
FIG. 9 shows a view of an alternative optical waveguide from above.
Figure 10:
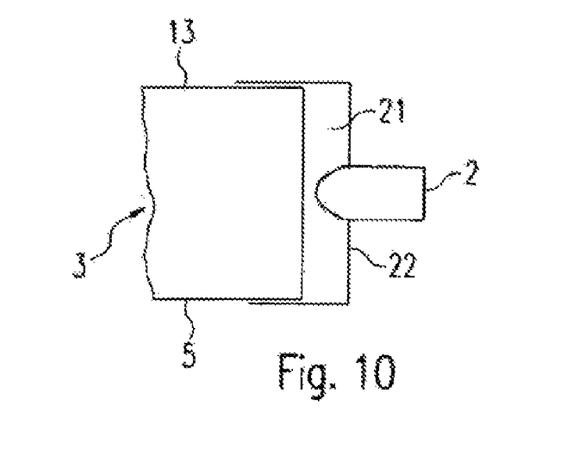
FIG. 10 shows a cross-section through the optical waveguide shown in FIG. 9, along the connecting line AA.

FIGS. 9 and 10 show a further possible form of the luminaire according to the invention. FIG. 9 shows a plate-shaped optical waveguide 3, LEDs 2 and a reflector 22 which is still to be discussed, seen from above. FIG. 10 also shows a cross-section through the optical waveguide shown in FIG. 9, along the line AA.

The coupling-in structure 10 is formed here by semicylindrical recesses 21 in the narrow sides 4 of the plate-shaped optical waveguide 3, the axis of symmetry of the corresponding cylinder being arranged perpendicularly to the flat side 5. The LEDs 2 extend into the recesses.

Additionally, the narrow side and the marginal regions of the flat side 5 and the opposite flat side 13 are enclosed by a U-shaped reflector 22. This U-shaped reflector 22 has, at the height of each of the LEDs 2, a hole into which the corresponding LED 2 can be introduced.

The reflector 22 covers the marginal regions of the flat sides 5, 13, and correspondingly ensures that light beams which the LED 2 emits at very steep angles do not leave the plate-shaped optical waveguide at this steep angle but are reflected back into the optical waveguide.

Alternatively, the reflector 22 can be not in the form of a separate component, but instead a reflecting coating can be brought out on the narrow sides 4 and the marginal regions of the flat sides 5, 13 of the optical waveguide. In this case, of course, it is necessary to take into account, in the same way, that immediately next to the LEDs 2, no reflecting coating is applied, since here the light is coupled into the optical waveguide 3.

The use of a U-shaped reflector 22, or vapor deposition of a corresponding reflecting layer, is not only useful in the case of a coupling-in structure 10 which has semicylindrical recesses of the narrow sides 4, but also in the case of the previously described coupling-in structure 10, in which a pyramid-shaped structure with an inwardly curved peak 11 is formed in front of the LEDs 2. Here too, it is necessary to take into account that the reflector 22 has recesses for the LEDs 2, and that immediately next to the LEDs 2, no reflecting coating is deposited.

Altogether, the luminaire 1 according to the invention is characterized by an extremely flat shape, the light which the LEDs 2 generate being radiated as direct lighting 6 over the flat side 5 of the plate-shaped optical waveguide. Additionally, according to the invention the luminaire 1 is equipped with second illuminants 7, which radiate light in a different spatial direction as indirect lighting 9.

The invention claimed is:

1. A luminaire, having
a plate-shaped optical waveguide,
first illuminants, arranged on one or more narrow sides of the optical waveguide and designed to couple light into the plate-shaped optical waveguide, the light coupled into the optical waveguide being emitted via a flat side of the optical waveguide in a first radiating direction of the luminaire, wherein
the first illuminants comprise multiple LEDs, the luminaire further comprising second illuminants and a reflector arrangement which is associated with the second illuminants, and via which reflector arrangement the light of the second illuminants is emitted in a second radiating direction opposite to the first radiating direction, and
the narrow sides of the plate-shaped optical waveguide, to which the light of the first illuminants is coupled each form, directly in front of each LED, a pyramid-shaped structure with an inwardly curved peak for coupling the light in evenly.

2. A luminaire as claimed in claim 1, wherein the luminaire is a pendant luminaire adapted to be fixed to a ceiling.

3. A luminaire as claimed in claim 1, wherein the first illuminants comprise multiple LEDs in at least two different colors.

4. A luminaire as claimed in claim 1, wherein the first illuminants comprise LEDs that emit white light.

5. A luminaire as claimed in claim 1, wherein the narrow sides of the plate-shaped optical waveguide in regions of the coupling-in structure, the flat side, and an opposite side of the optical waveguide in regions of the coupling-in structure, are in reflecting form.

6. A luminaire as claimed in claim 1, wherein the narrow sides of the plate-shaped optical waveguide are overlapped by a reflector, which in regions of the coupling-in structure has recesses, through which the first illuminants extend into the coupling-in structure.

7. A luminaire as claimed in claim 1, wherein the second illuminants comprise at least one discharge lamp.

8. A luminaire as claimed in claim 1, wherein the first and second illuminants can be controlled separately from each other to set settings for the first and second illuminants separately.

9. A luminaire as claimed in claim 8, wherein in the first radiating direction, behind the translucent closing plate with an anti-glare structure or diffuser, a plane, translucent closing plate is arranged.

10. A luminaire as claimed in claim 8, wherein said settings include one or more settings selected from the group consisting of light quantity and light color.

11. A luminaire as claimed in claim 1, wherein a side of the plate-shaped optical waveguide opposite the flat side of the plate-shaped optical waveguide that is intended to emit light has a light-scattering structure.

12. A luminaire as claimed in claim 1, wherein a reflector is arranged on a side of the optical waveguide opposite the flat side of the plate-shaped optical waveguide that is intended to emit light.

13. A luminaire as claimed in claim 1, wherein in the first radiating direction, behind the plate-shaped optical waveguide, a translucent plate with an anti-glare structure or diffuser is arranged.

14. A luminaire as claimed in claim 1, wherein the plate-shaped optical waveguide is held by at least two opposed supporting members, the LEDs and holders for the second illuminants being arranged in these supporting members.

* * * * *